Jan. 20, 1953

L. A. JOHNSON ET AL 2,626,169

FLUID SEAL

Original Filed April 18, 1947

INVENTORS
LLOYD A. JOHNSON
FRED A. HELFRECHT
HUGH T. STEWART
BY

ATTORNEY

Patented Jan. 20, 1953

2,626,169

UNITED STATES PATENT OFFICE 2,626,169

FLUID SEAL

Lloyd A. Johnson, Atherton, and Fred A. Helfrecht and Hugh T. Stewart, Redwood City, Calif., assignors to National Motor Bearing Co., Inc., Redwood City, Calif., a corporation of California Original application April 18, 1947, Serial No. 742,226. Divided and this application May 19, 1948, Serial No. 27,874

3 Claims. (Cl. 288—3)

This invention relates to improvements in fluid seals.

The present invention is an improvement over fluid sealing devices such as are shown in the 1933 Nelson Reissue Patent No. 18,829 and in Fig. 2 of Johnson Patent No. 2,146,677. It solves problems of cold flow and control encountered with the foregoing devices which made them impractical for long time use. It is a division of application Serial Number 742,226, filed April 18, 1947, now abandoned.

An object of the present invention is to provide a unitary fluid seal in which the sealing member may be of a molded resilient material and yet be supported and clamped in a case in such a way as to escape the problems of cold flow and loss of control of position of the sealing lip. When the Nelson seal was made with a leather sealing member, oil soon soaked into the latter, and the sealing lip changed position along the shaft, even to the point of moving out of the end of the case.

When the Nelson seal was made with a molded rubber or rubber-like sealing member, not only was it difficult to control the lip position, but also the clamping pressure produced cold flow which allowed fluid to leak past the sealing member and the case end wall.

Johnson sought to obtain control of the sealing lip position by the washer in Fig. 2 of Patent 2,146,677, but the seal proved impractical in use because the clamping pressure resulted in cold flow of the sealing material and leakage resulted due to loosening of the sealing member in the case.

The combination of the present structure, at long last, has solved these problems and has gone into very extensive use.

A preferred structure is shown in the drawings, in which.

Figure 1:
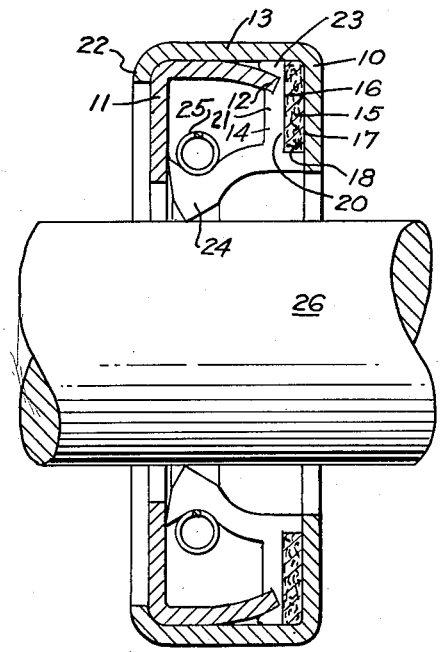
Fig. 1 is a view in elevation with the seal cross-sectioned on a shaft.
Figure 2:
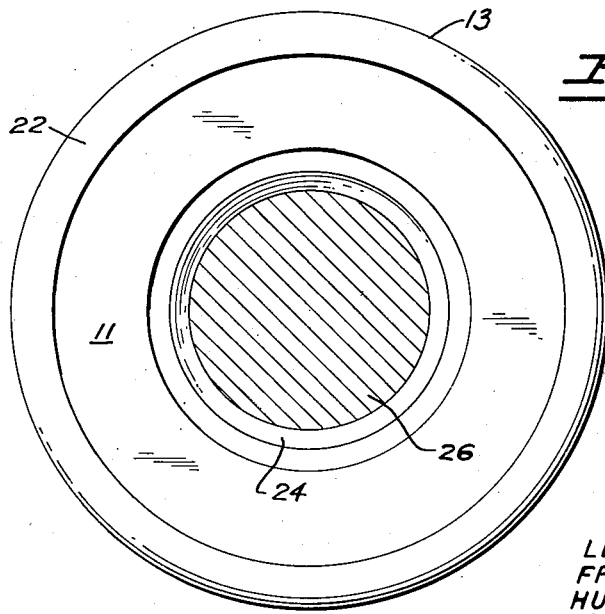
Fig. 2 is an end view of a complete seal.

The drawings show a fluid seal adapted for insertion as an assembled unit to seal the space between a bore in a housing and a shaft projecting therethrough. It includes a pair of inversely nested cup members 10 and 11 with the axially extending wall 12 of the inner cup member 11 dished inwardly away from the similar wall 13 on the outer cup member 10. The structure thus far described is substantially like Nelson Re. 18,829, but the present invention resides in the improvements over what he disclosed.

The sealing member 14 has a rigid washer 15 secured to its back side 16 where it forms the back face 17 of the sealing member. Except for bits of flashing which may remain from the molding operation, there is no resilient material on this back face 17, so that the rigid washer 15 is in direct contact with the rigid inside bottom wall 18 of the outer cup. This means there is no chance for cold flow to affect the parts at that point because both contacting parts 17 and 18 are rigid and non-flowable.

On the front face 20 of the rigid washer is a layer of resilient material 21 into which the dished rim 12 of the inner cup 11 embeds itself when the rim 22 on the outer cup is spun over to hold the parts together as a unit.

Preferably the rim 12 is embedded into the resilient material 21 to such an extent that there is only a thin film of material between the rim 12 and the adjacent front face 20 of the rigid washer. The shortcomings of drawings to illustrate such a relationship is shown here where the enlargement of the parts might tend to confuse. On the actual device there is almost direct contact of the rim 12 against the washer face 16. This means that there cannot be enough cold flow at this contact point to loosen the sealing member in the case and it means that the rubber or rubber-like material between the rim 12 and the inner wall of the outer case is displaced outwardly to form a gasket-like leak-tight seal 23 between the periphery of the sealing member and the outer case 13. In other words, it means that the sealing member is held in the case near its outer periphery by what amounts practically to a rigid contact on both sides 16 and 17 of the washer 15; and yet the resilient material 21 seals around the inner case rim 12 where cold flow will not be enough to permit any leakage of oil. As shown on the drawing, the band of rubber formed in radial alignment with the stiffening member 15 seals against the inside bottom wall 18 of the outer cup 10.

The sealing member 14 may be made of any moldable rubber or rubber-like material possessing the desired resistance characteristics for the fluid to be sealed. The rigid washer 15 may be of metal, fibre, or other rigid material, the important things being that it should constitute the back face of the sealing member so there is no material there to cold flow; that it should be rigid enough to control the sealing lip 24 against shifting axially along the shaft 26; and that the resilient material 21 should be soft enough to permit the rim 12 to bury itself completely in it.

A spring 25 may be used to hold the lip 24 on the shaft 26.

While one form of structure has been used for illustration in compliance with the statute, U. S. Rev. St., sec. 4888, it is clear that, once the present solution to the problem has been disclosed, those skilled in the art may devise modifications and still come within the invention as claimed herein, and it is intended to include all such modifications.

What we claim is:

1. A sealing device for sealing an annular space between a cylindrical surfaced rotatable shaft and a cylindrical surfaced opening in a machine part through which the shaft extends, comprising a housing having a pair of apertured, spaced apart radial end walls through which the shaft may extend, and a cylindrical connecting wall adapted for non-rotative fit on one of the aforesaid cylindrical surfaces; a sealing element comprising a molded resilient sealing member having a radial web, a sleeve-like sealing flange extending axially from one peripheral portion of said web and adapted to effect a running seal with the other of the aforesaid cylindrical surfaces, and the other peripheral portion effecting a seal with the cylindrical wall of said housing, said sealing element also having a rigid, substantially flat, annular stiffening member fixed to the side of said radial web remote from the sealing flange, said member extending a less radial distance than said radial web, the web providing a band-like peripheral sealing portion on said molded resilient member in radial alignment with said stiffening member, with the back face of said stiffening member in substantial alignment with the back radial face of said band-like portion; the back face of said stiffening member and said band-like portion contacting one of the radial walls of the housing, and means for holding said member in leak-tight contact with said radial wall.

2. The device of claim 1 in which said band-like peripheral sealing portion of said sealing element is on said one peripheral portion.

3. The device of claim 1 in which said holding means includes an axially extending inner case flange which latter embeds itself in a portion of the radial web of said molded sealing member which is in axial alignment with said stiffening member and displaces a portion thereof into tighter sealing contact with said cylindrical connecting wall while at the same time holding said band-like peripheral sealing portion in sealing contact with the radial end wall adjacent it.

LLOYD A. JOHNSON.
FRED A. HELFRECHT.
HUGH T. STEWART.

REFERENCES CITED

The following references are of record in the file of this patent:

UNITED STATES PATENTS

| Number | Name | Date |
|---|---|---|
| Re. 18,829 | Nelson | May 9, 1933 |
| 1,690,839 | Roth | Nov. 6, 1928 |
| 2,040,379 | Heinze | May 12, 1936 |
| 2,117,849 | Novey et al. | May 17, 1938 |
| 2,146,677 | Johnson | Feb. 7, 1939 |
| 2,316,713 | Procter | Apr. 13, 1943 |
| 2,348,587 | Antonelli | May 9, 1944 |
| 2,395,359 | Vedovell | Feb. 19, 1946 |
| 2,466,335 | Stearns | Apr. 5, 1949 |